Sept. 23, 1941.  E. C. ROGERS  2,256,651
PHOTOGRAPHIC ENLARGER
Filed June 7, 1939   2 Sheets-Sheet 1
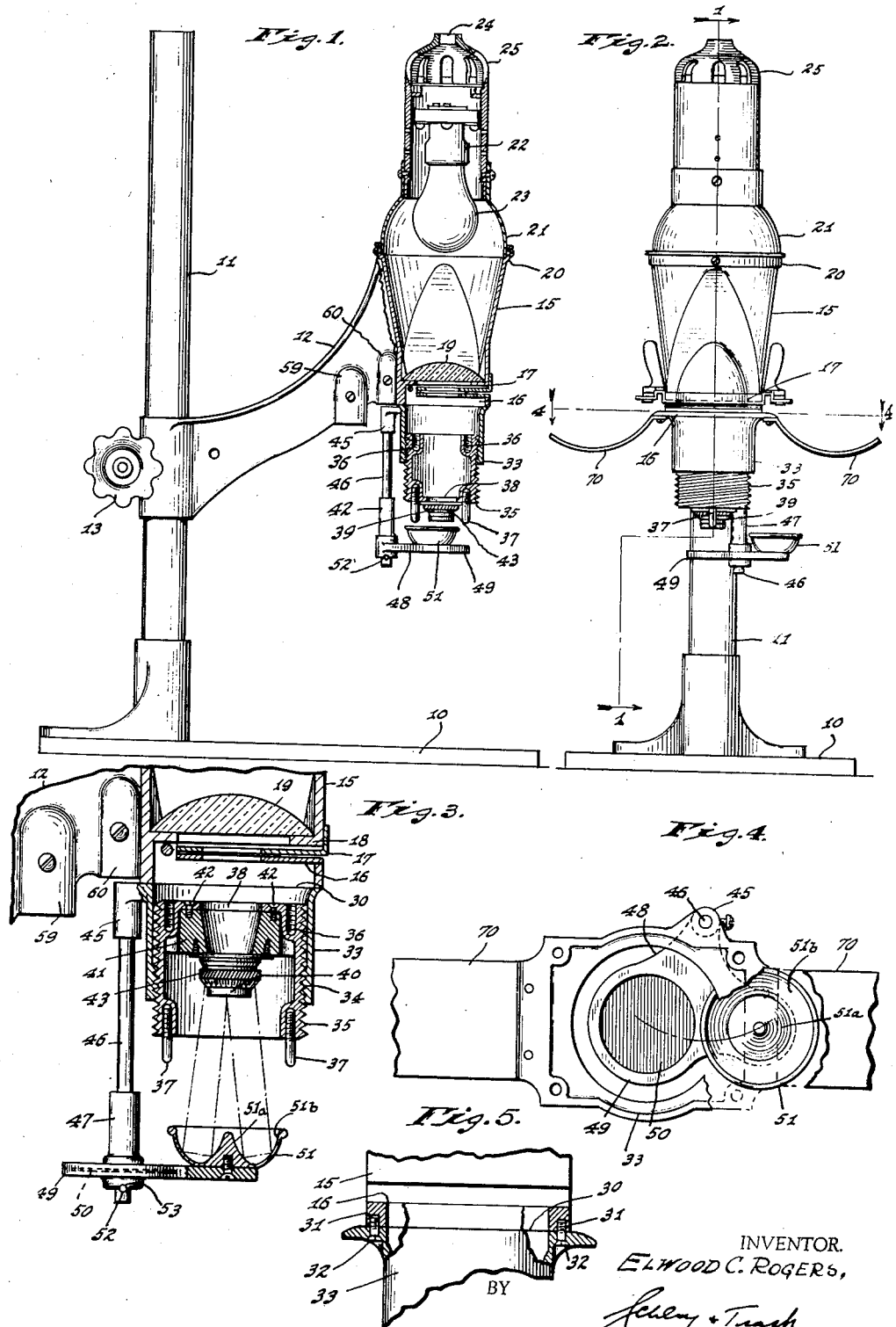
INVENTOR.
ELWOOD C. ROGERS,
BY
ATTORNEYS.

Sept. 23, 1941.   E. C. ROGERS   2,256,651
PHOTOGRAPHIC ENLARGER
Filed June 7, 1939   2 Sheets-Sheet 2
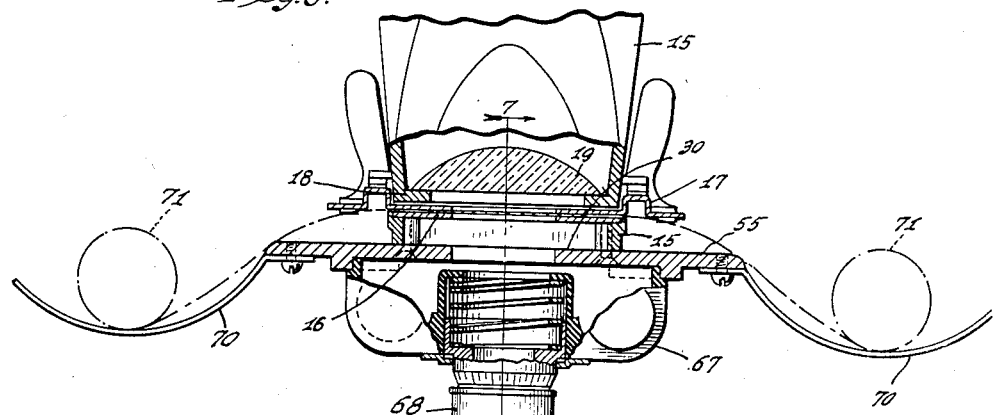
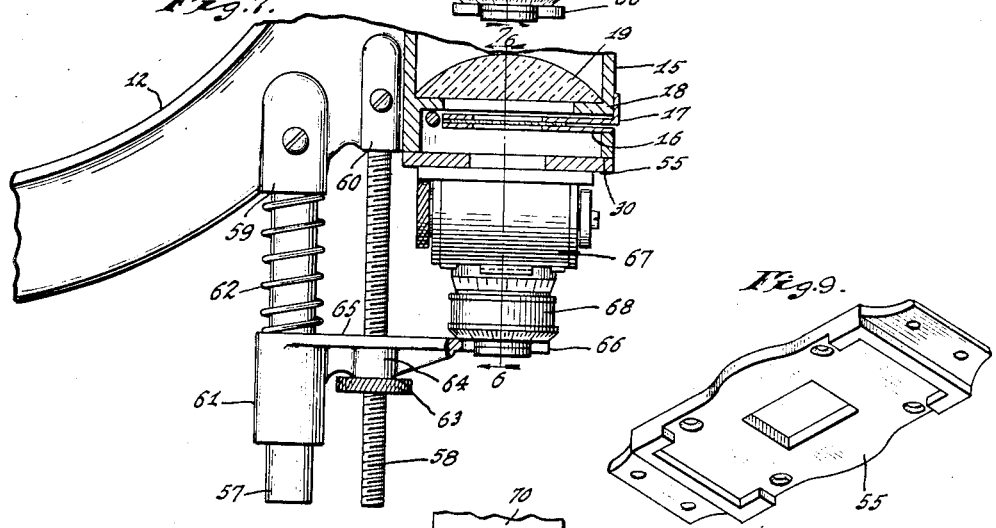
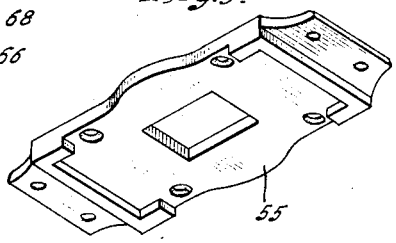
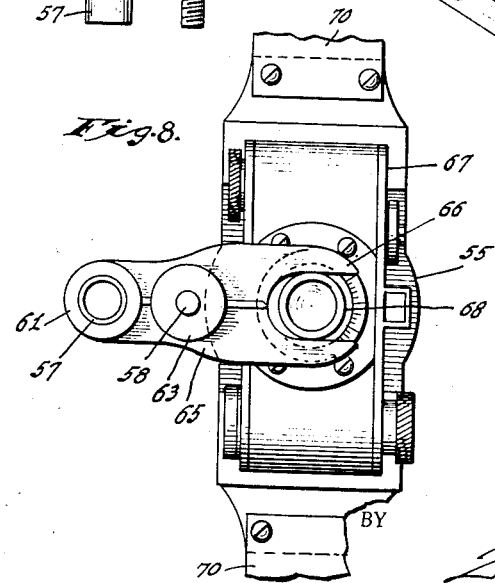
INVENTOR.
ELWOOD C. ROGERS,
BY
ATTORNEYS.

Patented Sept. 23, 1941

2,256,651

UNITED STATES PATENT OFFICE 2,256,651

PHOTOGRAPHIC ENLARGER

Elwood C. Rogers, Indianapolis, Ind.

Application June 7, 1939, Serial No. 277,886

10 Claims. (Cl. 88—24)

It is the object of my invention to improve the construction of photographic enlargers.

A particular object is to provide a structure which is readily adaptable for lenses of different focal lengths, and also for the mounting of either lenses that are special lenses or the lens-carrying portions of standard miniature cameras.

Other objects will appear hereinafter.

The accompanying drawings illustrate my invention:

Fig. 1 is a side elevation, with the enlarger proper in section on the line 1—1 of Fig. 2, of a photographic enlarger embodying my invention, showing it equipped with a special lens; Fig. 2 is a front elevation of the photographic enlarger shown in Fig. 1; Fig. 3 is a fragmental enlargement of the lens mounting and directly associated parts of Fig. 1, with the movable scale-lighting reflector in section; Fig. 4 is a fragmental transverse section, on a somewhat enlarged scale, on the line 4—4 of Fig. 2; Fig. 5 is a fragmental view, partly in elevation and partly in section, showing the removable mounting of the barrel 33; Fig. 6 is a part elevation and part sectional view similar to Fig. 5, but showing a movable mounting of a camera on the enlarger, in place of the barrel of Fig. 3, the section being taken on the line 6—6 of Fig. 7; Fig. 7 is a fragmental view in partial section on the line 7—7 of Fig. 6; Fig. 8 is a bottom view of the camera mounting of Figs. 6 and 7; and Fig. 9 is a perspective view of the camera-abutting board used in the arrangement shown in Figs. 6, 7, and 8.

The enlarger has a base plate 10 on which may be placed the light-sensitive member on which the enlargement is to be made, such for instance as light-sensitive paper or film or plate. An upright 11 rises from one end of the base plate 10, to an arm 12 which is vertically adjustable on that upright 11 and is clampable in any desired position thereon, as by a clamping screw 13.

The outer end of the arm 12 is provided with a housing 15, which is conveniently part of the same casting with the arm 12. This housing 15 is a shell which is open at both top and bottom, and tapers downwardly. Near its lower end, the housing 15 is provided with a transverse slot 16 for receiving a negative carrier 17; but that negative carrier and its mounting is a separate invention that is the subject of my co-pending application Serial No. 319,421, filed February 17, 1940, and so is not described in detail herein. Just above the transverse slot 16, the housing 15 is preferably provided with an inwardly extending flange 18 on which a suitable condensing lens 19, shown as a plano-convex lens, may rest. I consider this condensing lens very desirable; but it is not fundamentally essential.

The upper end of the housing 15 is provided with a bell enlargement 20 for receiving the lower end of a bulb-housing 21 which carries a lamp socket 22 in which a suitable depending lamp bulb 23 is mounted. The upper end of the bulb-housing 21 is provided with a central opening 24 for a lamp cord (not shown) which supplies current to the lamp bulb 23, and with ventilating openings 25 to permit the outflow of air that is heated by that lamp bulb 23.

Below the transverse slot 16 which receives the negative carrier, the housing 15 is provided with a flat lower end 30, with walls which at least in places are thick enough to have threaded holes 31 to receive screws 32 by which various things may be supported from that lower end of the housing 15. If the enlarger is to be complete in itself, a barrel 33 is fastened to that lower end of the housing 15 by the screws 32; which barrel is provided, at least at its lower end, with internal threads 34. An externally threaded sleeve 35 may be screwed into the internally threaded barrel 33, with either end of the sleeve 35 uppermost. The sleeve 35 is provided at both ends with a pair of threaded longitudinally extending holes 36, conveniently near the opposite ends of a diameter, for receiving threaded pins 37 to provide a convenient finger hold for adjusting the sleeve 35 in the barrel 33; and the pins 37 are put in the holes 36 in whichever end of the sleeve 35 is to be downward.

One end of the sleeve 35 is provided with an inwardly extending flange 38, in which an objective lens 39 of long focal length may be mounted, with that lens projecting below the flange 38 when the flange 38 is at the bottom end of the sleeve. If an objective lens of short focal length is desired, however, the sleeve 35 may be turned end for end, so that the flange 38 is at its upper end, and a short-focus lens 40 may be mounted inside of the sleeve, either directly in the flange 38 or in a suitable block 41 which may be suitably attached to the flange 38 as by screws 42. In either case, the objective lens 39 or 40 is desirably provided with an adjustable diaphragm, conveniently adjustable by the usual circumferentially movable knurled collar 43 by which the size of its light-transmitting opening may be adjusted, in known manner.

The barrel 33 is provided on one side with a boss 45 in which a vertically adjustable depending stem 46 is mounted. On the lower end of this stem is rotatably mounted a sleeve 47 which is vertically adjustable with the stem 46 and which has projecting from it an arm 48 provided at its outer end with a ring 49 carrying a light-reducing screen 50, most desirably a ruby plate, as of glass or Celluloid. At one side the ring 49 carries a reflector 51 of which the upper surface has a central upwardly projecting cup 51$^a$ and an outer upwardly projecting rim 51$^b$; which co-operate to reflect light upward on to the area surrounding the objective lens, as is indicated in Fig. 3. The arm 48 may be swung on the stem 46 to several positions. These include one in which the ruby plate 50 is centered on the axis of the lenses 19 and 39 or 40, to reduce the light which passes through to any light-sensitive material on the table 11 and desirably to make it a substantially non-actinic light; one in which the reflector 51 is centered on that axis, to reflect light upward so that the graduations of the diaphragm-adjusting collar 43 may be lighted up; and one in which both the ruby plate 50 and the reflector 51 are out of the light path. The sleeve 49 rests on a cross-pin 52; and the lower end of the sleeve may have positioning notches 53 which co-operate with the cross-pin to position the sleeve, as with the ruby plate 50 and/or the reflector 51 in the light-axis of the enlarger or with both out of that light-axis to leave the light path clear.

The barrel 33 and the parts carried thereby may be removed, as by removing the screws 32, and the lens-carrying body portion of a standard miniature camera may be mounted against the lower end 30 of the housing 15, so that the lens of that camera may serve as the objective lens. Such a camera usually has a removable back, which is removed for this mounting. For this mounting of a camera body, I provide a board 55 which covers the open back of the camera body after the camera's own back has been removed, and which has a central light-transmitting opening 56 through it. The board 55 may be attached against the lower end 30 of the housing 15 by the screws 32, although such rigid attachment is not essential; and the camera may be held against the board 55 in any suitable way.

A convenient way to hold the camera body is to provide depending stems 57 and 58, the latter threaded, which are mounted in and depend from sockets 59 and 60 provided in the arm 12, and to mount on the stem 57 a sleeve 61 which is spring-pressed downward by a spring 62 and is movable upward by a nut 63 mounted on the threaded stem 58 and co-operating with a boss 64 on an arm 65 extending laterally from the sleeve 61. The arm 65 may be provided at its outer end with a fork 66 by which it supports a camera body 67 and presses it upward against the board 55. While the fork 66 may engage the body of the camera, in which case the regular focusing mechanism of the camera is used to focus the camera lens 68, yet if the camera is one which has an outwardly spring-pressed lens structure, as is a well-known construction, the fork 66 desirably engages the under side of that outwardly spring-pressed lens structure, in which case movement of the nut 63 serves to produce the necessary focussing adjustment.

With this construction, it is possible to sell the enlarger with or without the sleeve 33 and its carried parts, so that the buyer may use his own miniature camera for furnishing the focusing objective lens and so save the cost of a special objective lens; or to sell them with the barrel 33 and with either a long-focusing or a short-focusing objective lens if the buyer desires a special lens instead of using the lens of his own miniature camera. If he uses his own camera he may obtain the desired focusing by manipulating the nut 63. If he uses a special lens 39 or 40 he may obtain the desired focusing by manipulating the sleeve 35 by the pins 37 which depend therefrom.

I desirably provide upwardly concave carrier plates 70, conveniently of sheet metal, on opposite sides of the enlarger, just below the plane of the slot 16, to carry rolls 71 of film on opposite sides of the particular film-picture which is being enlarged. These carrier-plates 70 may be supported in any suitable manner, as by being fastened by screws to lateral lips of the barrel 33 if the barrel is used; although, instead, they may be fastened by screws to the side walls of the lower end of the housing 15 below the slot 16, or may be fastened to the lower part of the frame below the light opening.

I claim as my invention:

1. In a photographic enlarger, a housing arranged to enclose a light source and provided with a condensing lens and a negative holder, said housing at its end opposite the light source being arranged to receive alternatively either a special lens-carrying mechanism or the lens-carrying body portion of a miniature camera.

2. In a photographic enlarger, a housing arranged to enclose a light source and provided with a negative holder, said housing at its end opposite the light source being arranged to receive alternatively either a special lens-carrying mechanism or the lens-carrying body portion of a miniature camera.

3. In a photographic enlarger, the combination of a base, an upright, an arm vertically adjustable on said upright, said arm being provided with a housing arranged to enclose a light source and to carry a condensing lens and a negative holder and being provided at its lower end with means for receiving alternatively a special lens-carrying mechanism or a standard camera body having a lens.

4. In a photographic enlarger, the combination of a base, an upright, an arm vertically adjustable on said upright, said arm being provided with a housing arranged to enclose a light source and to carry a negative holder and being provided at its lower end with means for receiving alternatively a special lens-carrying mechanism or a standard camera body having a lens.

5. In a photographic enlarger, the combination of a base, an upright, an arm vertically adjustable on said upright, said arm being provided with a housing arranged to enclose a light source and to carry a negative holder and being provided at its lower end with means for receiving the lens-carrying body portion of a standard camera, said arm being provided with two depending stems one of which is screw-threaded, and a slide mounted on said stems and adjustable parallelly therealong by a nut on the screw-threaded stem for holding the lens-carrying body portion of the camera against the lower end of said housing.

6. In a photographic enlarger, the combination of a base, an upright, an arm vertically adjustable on said upright, said arm being provided with a housing arranged to enclose a light source and to carry a negative holder and being provided at its lower end with means for receiving the lens-carrying body portion of a standard camera, said arm being provided with two depending stems one of which is screw-threaded, and a slide mounted on said stems and adjustable parallelly therealong by a nut on the screw-threaded stem, said slide being provided with a fork for engaging one part of said lens-carrying mechanism of said camera body portion to move that part with respect to the remainder to focus the lens and also to hold the lens-carrying body portion of the camera against the lower end of the housing.

7. In a photographic enlarger, the combination of a base, an upright, an arm vertically adjustable on said upright, said arm being provided with a housing arranged to enclose a light source and to carry a negative holder and being provided at its lower end with means for receiving the lens-carrying body portion of a standard camera, said arm being provided with a screw-threaded depending stem, and a slide mounted on said stem and adjustable parallelly therealong by a nut on said stem for holding the lens-carrying body portion of the camera against the lower end of said housing.

8. In a photographic enlarger, the combination of a base, an upright, an arm vertically adjustable on said upright, said arm being provided with a housing arranged to enclose a light source and to carry a negative holder and being provided at its lower end with means for receiving the lens-carrying body portion of a standard camera, said arm being provided with a screw-threaded depending stem, and a slide mounted on said stem and adjustable parallelly therealong by a nut on said stem, said slide being provided with a fork for engaging one part of said lens-carrying mechanism of said camera body portion to move that part with respect to the remainder to focus the lens and also to hold the lens-carrying body portion of the camera against the lower end of the housing.

9. In a photographic enlarger, the combination of a base, an upright, an arm vertically adjustable on said upright, said arm being provided with a housing arranged to enclose a light source and to carry a negative holder and being provided at its lower end with means for receiving the lens-carrying body portion of a standard camera, said arm being provided with a depending stem, and a slide mounted on and adjustable along said stem for holding the lens-carrying body portion of the camera against the lower end of said housing.

10. In a photographic enlarger, the combination of a base, an upright, an arm vertically adjustable on said upright, said arm being provided with a housing arranged to enclose a light source and to carry a negative holder and being provided at its lower end with means for receiving the lens-carrying body portion of a standard camera, said arm being provided with a depending stem, and a slide mounted on and adjustable along said stem, said slide being arranged to engage one part of said lens-carrying mechanism of said camera-body portion to move that part with respect to the remainder to focus the lens and also to hold the lens-carrying body portion of the camera against the lower end of the housing.

ELWOOD C. ROGERS.